United States Patent [19]

Martin et al.

[11] Patent Number: 4,860,226

[45] Date of Patent: Aug. 22, 1989

[54] METHOD AND APPARATUS FOR BAR CODE GRAPHICS QUALITY CONTROL

[76] Inventors: Edward L. Martin, 3946 Vineyard Trace, NE.; Fred G. Graham, 3932 Rockmill Pkwy., both of Marietta, Ga. 30062; Benjamin Roman, 4390 Marsh Rd., Marietta, Ga. 30066

[21] Appl. No.: 306,230

[22] Filed: Feb. 6, 1989

Related U.S. Application Data

[63] Continuation of Ser. No. 905,119, Sep. 9, 1986, abandoned.

[51] Int. Cl.$^4$ .................. G06F 15/20; G06K 7/10; G06K 9/00; B07C 5/00

[52] U.S. Cl. .................. 364/552; 209/583; 235/470; 235/437; 250/566; 356/394; 382/57

[58] Field of Search ............... 364/552, 525, 554, 575, 364/405, 478; 235/463, 465, 470, 435–437, 487; 250/566, 568; 350/6.6, 6.8; 356/394; 209/569, 583; 382/57, 58

[56] References Cited

U.S. PATENT DOCUMENTS

| | | | |
|---|---|---|---|
| 3,704,362 | 11/1972 | Kolboy et al. | 364/552 |
| 3,912,909 | 10/1975 | Harrison | 209/583 X |
| 3,961,164 | 6/1976 | Reed et al. | 235/495 X |
| 4,013,997 | 3/1977 | Treadwell, III | 235/437 X |
| 4,044,227 | 8/1977 | Holm et al. | 209/583 X |
| 4,166,574 | 9/1979 | Yokoyama | 235/464 X |
| 4,223,790 | 9/1980 | Yoshida | 364/552 X |
| 4,305,667 | 12/1981 | Nachtrieb | 356/384 X |
| 4,360,798 | 11/1982 | Swartz et al. | 235/463 |
| 4,411,016 | 10/1983 | Wakeland | 235/463 X |
| 4,575,625 | 3/1986 | Knowles | 235/470 X |
| 4,587,411 | 5/1986 | Obstfelder et al. | 235/437 |
| 4,646,353 | 2/1987 | Tenge et al. | 235/437 |
| 4,665,496 | 5/1987 | Ott | 364/552 X |
| 4,667,089 | 5/1987 | Shirakabe et al. | 235/462 |
| 4,679,154 | 7/1987 | Blanford | 364/405 X |
| 4,697,245 | 9/1987 | Kara et al. | 364/552 |
| 4,707,251 | 11/1987 | Jenkins et al. | 209/583 X |

*Primary Examiner*—Parshotam S. Lall
*Assistant Examiner*—Joseph L. Dixon
*Attorney, Agent, or Firm*—Hurt, Richardson, Garner, Todd & Cadenhead

[57] ABSTRACT

Method and apparatus for reading, by an end user scanner, the UPC number designated by a bar code printed on or associated with a predetermined number of packages or containers for or containing goods to determine the percentage of correctly read UPC numbers with reference to the predetermined number of readings.

17 Claims, 5 Drawing Sheets

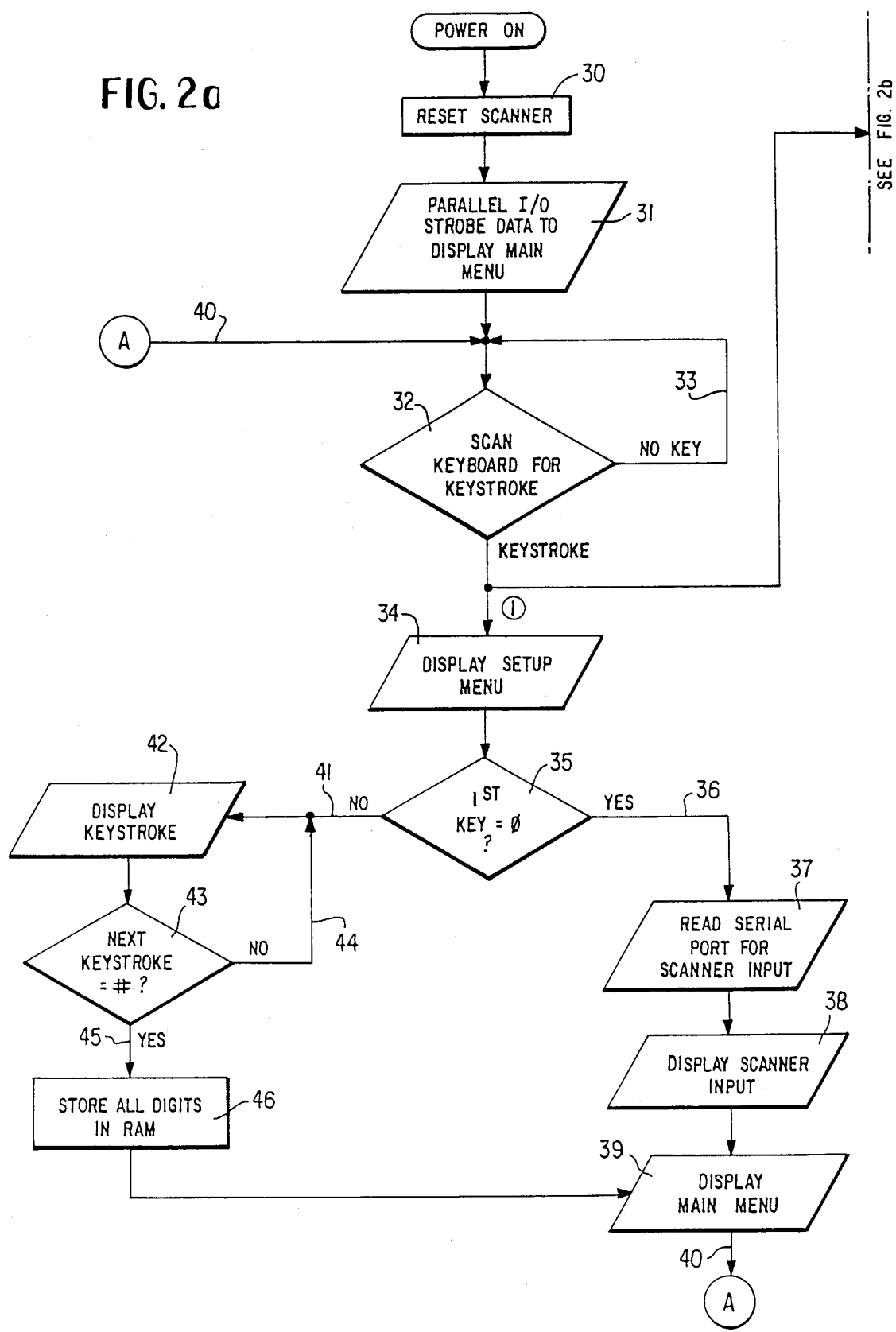

METHOD AND APPARATUS FOR BAR CODE GRAPHICS QUALITY CONTROL

This application is a continuation of application Ser. No. 905,119, filed on Sept. 9, 1986, now abandoned.

BACKGROUND OF THE INVENTION

The use of a universal product code (UPC) has gained wide acceptance in the retail industries, particularly in the grocery and food industry, although it is not necessarily so limited in use and can be expected to gain even wider acceptance in the future.

The principle involved is the use of a bar code which uniquely identifies each assigned product by a series of lines and spaces of varying widths which may be decoded to a multiple digit representation. The unique identification is the subject of the UPC and has been standardized for a wide range of products.

At the point of sale, the bar code is read by suitable scanning apparatus and the identification utilized for diverse purposes such as inventory control, pricing, etc., all as is well known.

The use of this bar code has imposed severe problems upon the graphics arts industry whose function is to prepare the labeling, etc., which bears the proper bar code symbol for the product in question. That is to say, the printing of the bar code in mass production normally relies upon a flexographic or an offset printing process from which the widths and spacings of the bar code lines and spaces therebetween must be controlled accurately so that the scanning apparatus may read the bar code with high degree of accuracy. This problem is well known and special apparatus has been developed to aid the graphics art processor in maintaining the requisite quality control. Examples of such apparatus are disclosed in the U.S. Pat. No. 4,360,798 of 11/23/82 to Swartz et al, a divisional application of U.S. Pat. No. 4,251,798, and in U.S. Pat. No. 4,396,361, the disclosures of which are incorporated herein by reference. Basically, what apparatus of this type does is to scan the bar code which has been printed and, in controlled and specified fashion derive a "readability measure" criteria therefrom which apprises the user of the quality of the printed bar code from which adjustments, changes, etc., of the printing process may be made. This "readability measure" is referenced the "Percent Decode" or PD and is based upon many factors which may affect the bar code's symbol readability and which in reality is useful only to the printer. A partial list of these factors includes print contrast, uniform barwidth growth, asymmetric barwidth growth, extent and size of any spots or voids, substrate opacity, showthrough, and scatter. In each case, there exists a transition band over which symbol readability is very strongly affected by small changes in the parameter in question. In theory, there should exist for each parameter an absolute cut off point above which readability is 100%, and below which readability is 0%. However, the algorithm upon which the PD is based generates a "conservative" (insofar as the end user is concerned) statistical value for PD from a single scan, and which PD may be of any value, as low as 10%, for example. This anomaly raises many problems in the industry and has little to do with verifying to the ultimate user the quality of the printed bar code with which he must deal.

The anomaly is created by the fact that the bar codes are checked at locations which are not the end user location, and the end user must therefore blindly accept a product which is represented to him as being of proper quality insofar as readability of the bar code is concerned. As noted, the bar code is normally checked at more than one location. First, the printer checks the bar code which he is printing, usually on a quality control basis during the printing process, and it is here that the system is truly operative, because it enables the printer to take corrective measures in response to deteriorating print quality. However, the absolute value of the PD is of little meaning except as to variations and changes therein (i.e., deterioration), especially as concerns the next person processing the labels to which the bar codes are being applied. That is to say, there is no guarantee that the next processor (the processor who applies the labels to the goods, for example) will read the same PD as did the printer, even though he may be using identical equipment. Thus, this next processor must arbitrarily decide what PD he will establish as being sufficient to meet the needs of the end user.

In this way, whether the end user receives his goods directly from the printer or from a processor applying labels to the goods, he is at the mercy of a guessing game. For example, the printer may check the bar code on a quality control sample basis after the printing process and determine, for example, that the PD is 40%, which the printer may decide will be acceptable to the label applier, and that batch of printed material may be checked by the label applier and found to check with a PD of 20%. This packager must decide whether that value of PD is going to meet the needs of the end user.

The variation in PD may be due entirely to the fact that the printer used one apparatus for checking whereas the packager used another apparatus, even though both were identical in make and type of apparatus and thus ostensibly identical as to result. On the other hand, the variation may also be due to the fact that the apparatus attempts to simulate, based upon a single scan, the statistical average of many different scans having different orientations of the bar code relative to the scanning head. Since neither used an apparatus which is the same as the scanning apparatus which will be used at the point of end use, say the checkout counter scanner at a supermarket, the PD determined either by the printer or the subsequent packager has little if any significance to the end user and may, in fact, confer little or no confidence to the end user that the bar code as scanned and determined at the point of use will be adequate for the intended purpose. Since the end user will suffer from any error in reading of the bar code (whether the error is due to an incorrect number being read or no number being read), the current situation is entirely inadequate insofar as the end user is concerned.

To summarize the background of this invention to this point, great difficulty is encountered in the process of printing bar codes, packaging goods with the bar code readable thereon and accurately reading the bar code on the packaged goods at the point of sale. Many variables are involved in this chain of the process. First of all, the readabilty of the bar code at the point of sale depends upon the quality control of the printing process. Secondly, the bar code must be readable at each potential point of sale. Because the scanning laser device at each point of sale may "see" the bar code in its own unique way which may be different from what will be "seen" at any other similar device at any other point of sale, a tremendous difficulty is encountered because of this factor alone.

At any point of sale, two important factors in reading the bar code are critical. First and foremost, the correct UPC number must be read, otherwise the entire purpose of using UPC designation is lost. Secondly and by no means of lesser importance, reading should be successful upon the first scan of the bar code, otherwise the rapidity and proper flow of tallying the results of scanning and reading at the point of sale is seriously affected.

Thus, the mere fact that the bar code is readable on the first scan is not sufficient unless that read corresponds with the correct UPC number which that bar code is supposed to represent. On the other hand, if it takes more than one scan of the bar code to produce a UPC number output, that output must be the correct UPC number. That is to say, it is imperative that the first successful "read" corresponds with the correct UPC number.

The results of quality control at the steps in the chain prior to the ultimate and final scan of the bar code absolutely determines the success of the entire system.

BRIEF SUMMARY OF THE INVENTION

Accordingly, it is of primary concern in connection with this invention to provide method and apparatus for quality control of bar code printing which is directly related to the requirements of the end user and which generates data meaningful to and upon which the end user may rely with confidence.

However, it is to be understood that the invention is not limited to the UPC system and in fact is applicable to any system in which codes or the like are produced, by whatever reproduction method, to identify particular data required by the end user. To this end, the underlying advantage of this invention resides in the ability to allow cooperation among the person or persons supplying the labels and/or packaging or the like and the end user, in order to select the most statistically significant requirement suited to that particular end user.

An object of the invention is to provide a method and apparatus by which the graphics art producer may perceive trends during the printing process which, if left unchecked, could result in reading errors at the point of sale while, at the same time, provides data which is meaningful to the end user.

Another object of the invention is to provide a method and apparatus which provides a consistent and meaningful measurement of bar code readability from the inception of the bar code generating process through any intermediate processors so that quality control of bar code readability may be assured more readily to the ultimate user at the point of sale.

The invention is oriented toward the end user to assure a more significant and meaningful indicator of the performance which may be expected from the bar code labels upon which the end user relies for proper operation of his retail business. It cannot reasonably be expected that bar codes on the consumer items will be read with 100% accuracy if the cost of using this convenience is to be kept within an affordable price. However, the end user requires an indicator which relates to a parameter which allows him to calculate the potential business loss due to incorrect bar code reading. Such an indicator is provided by this invention. With the apparatus of this invention, the indicator is the percentage of correct bar code "reads" which he may expect to obtain with the items with which he is supplied. If used by the printer, the percent accuracy is determined and this accuracy may be passed on to the processor who provides the end user with the finished product, properly labeled and having a reliable bar code label thereon. When the processor in turn uses the apparatus of this invention, he too will be in possession of a reliable and meaningful percentage figure in which the end user may place trust.

The currently available equipment is informative principally and almost solely to the operator of printing equipment and requires temporal sampling in order to provide meaningful results to the printer for controlling the printing run. That is, as noted above, the currently available equipment indicates trends in the form of PD readings which are occurring during the printing process and which, if left unchecked, ultimately will result in such a degradation of the bar codes being printed that they will be useless. The end user is not interested in the PD because it has no real meaning to him.

The invention as disclosed and claimed herein provides an indication of the percentage of "misreads" (i.e., either an inability to read or an incorrect read) which may be expected at the user end of the chain. To this end, the scanner utilized in this invention is a flattop scanner of the type used by the end user, in combination with a dedicated processor, keyboard, display and suitable software. The dedicated computer is interfaced with the scanner so as to provide on/off control as well as to receive and decode the electronic output of the scanner to identify numerically the bar code passed through the scanner's laser beam. A keyboard is electronically linked to the computer to permit entry of commands as well as numerical identification of the symbol to be scanned. The digital display is electronically linked to the computer to provide visual identification of the UPC number corresponding to the bar code scanned, to display comparison of this number with the correct number and, by command from the keyboard, to provide statistical analysis regarding the symbols which have been scanned. A strip printer may be linked with the computer to provide print-out of the statistical analysis. The software program contains the logic to control the laser scanner, decode the electronic output from the scanner to provide the UPC numerical identification of the bar code scanned, to store the correct code or codes, to provide comparison of the scanned symbol with the correct symbol in memory, and to cause the various displays.

BRIEF DESCRIPTION OF THE DRAWING FIGURES

FIGS. 2a and 2b represent a logic flow diagram according to one embodiment of the invention.

DETAILED DESCRIPTION OF THE INVENTION

Figure 1:
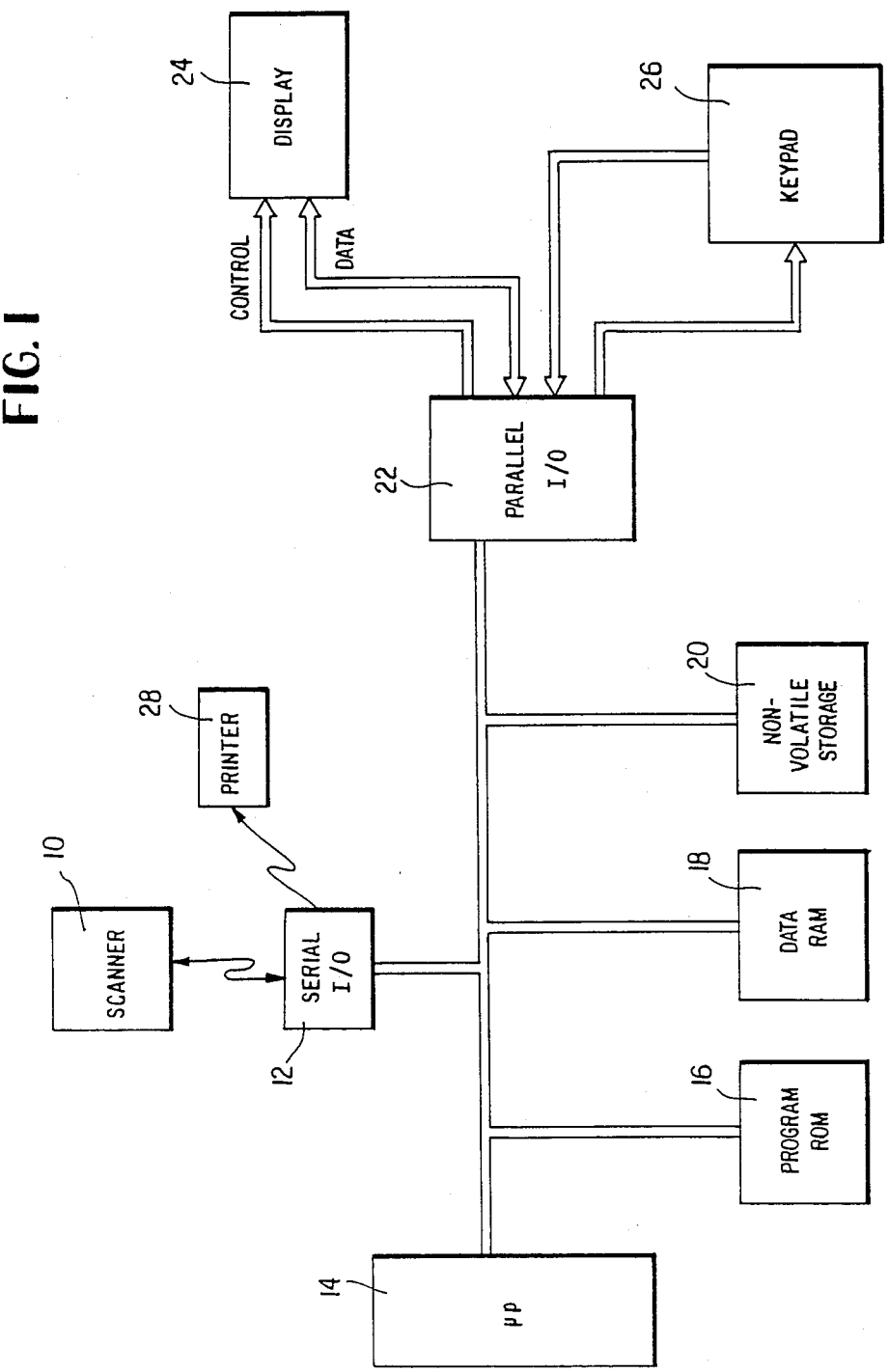
FIG. 1 is a diagrammatic illustration of a system according to this invention.

With reference to FIG. 1 at this time, reference character 10 indicates a flat top laser scanner which preferably is a Spectra physics, Inc. model 8610 or other store quality helium-neon laser scanner having equal bar code sensitivity. The serial output of the scanner 10 is coupled through the I/O device 12 having bus connection with the microprocessor 14 or equivalent computer. The computer components include the program ROM 16, the data RAM 18 and the non-volatile storage 20. The parallel I/O device 22 electronically links the computer system to the display unit 24 which may be of conventional nature and to the conventional keyboard unit 26. The printer 28 which may optionally be provided is coupled with the serial I/O device 12. All of the above components are available as items of commerce and will be well understood by those skilled in the art.

It is, however, pointed out that the scanning unit 10 should be of the type equivalent to a so-called store unit, that is, it should be a unit identical to or closely resembling the type of scanner which the end user will employ. This assures that the results of the program hereinafter described will most closely approximate the results which the end user will experience so that the statistical analysis provided by the invention will be meaningful to such end user. In this regard, the end user will know the percentage of "misreads" which he can tolerate and the supplier of his goods may thus assure, with this invention, that the requisite percentage is supplied to the end user. The printer may also employ this invention to obtain not only data meaningful to him concerning whether the printing process is degrading, but also he may pass on to the next processor data which, in turn, is meaningful to the end user.

The end user will require a percentage of "good" reads which typically may prove to be in the range of about 91-95%. This percentage is established by cooperation among the printer, the packager and the end user and this is easily assured by the invention. It is to be noted, as explained hereinbefore, that the particular percentage may be different for different end users and it is in this particular aspect that the invention derives a significant advantage over other systems which are available in the prior art.

The software logic flow will be apparent from FIG. 2. Whenever the system is powered up, the scanner is reset as at 30 and the main menu is displayed as indicated at 31. The main menu reads: ENTER COMMAND: 1/SETUP, 2/GO, 3/RST SCNR, */DISABLE, #/ENABLE LASER. Assuming the operator wishes to test a new bar code symbol which has never been tested before, "1" (for setup) is pressed on the keyboard and in response thereto, the setup menu is displayed as indicated by the logic at 34. Otherwise, the logic loops as indicated at 33 awaiting a keystroke entry. The setup menu reads: ENTER SCAN CODE. PRESS "0" TO ENTER CODE FROM SCANNER. The operator thus has two options, he may manually enter the scan code from the keyboard or he may enter the code by passing a bar code known to be correct over the scanner. If the former, the logic at 35 responds at the line 36 to the entry "0" to cause the scanner input to be displayed as at 37 and the main menu is redisplayed as at 39 and the system loops as at 40, awaiting the next keystroke. If, for some reason the display does not indicate the correct UPC number on the display, or the operator has changed his mind, "3" is pressed to reset the scanner and clear memory as at 58 and redisplay the main menu as at 59 and loop awaiting the next keystroke.

If the setup was correct and the desired number was displayed as at 38, when the main menu is redisplayed as at 39, the operator next enters the keystroke "2" and the test information is displayed as at 47. This display initially reads: TEST CODE A021900027256 NO. READ 0; CURRENT NO. ERROR 0, assuming that the correct UPC number was as indicated, i.e., A021900027256. The operator then proceeds to begin the test procedure by passing the bar code labels over the scanner. The serial input from the scanner is read as at 48 and the logic at 49 causes the first input to be compared with the correct UPC number. If correct, the "yes" answer at 50 causes the scan count to be updated as at 51. The display will now read: TEST CODE A021900027256 NO. READ 1; CURRENT NO. READ 0 unless the operator has pressed a key during the scan input, in which case the logic at 54, 56, 57 loops the system back to the condition awaiting an initial keystroke as at 32. If this operator error logic was not activated, the system loops as at 55 awaiting the next scan input.

For purposes of this description, it will be assumed that for the particular end user in question, it has been established by and among the printer, packager and end user that the number of bar codes which must be tested is thirteen and that the number of correct reads must be at least 91%. Using this arbitrary example, assume that at the end of the thirteen scans, the display reads: TEST CODE A021900027256 NO. READ 13, CURRENT A073040154156 NO. ERROR 1. The "CURRENT A073040154156" indicates that this number, rather than the correct number A021900027256 was read to produce the "NO. ERROR 1". The percentage statistical analysis corresponds to a percentage in excess of the required 91% (12/13×100). Accordingly, the test has indicated that the batch of goods from which the statistical sample was selected may be represented as passing the end user's requirements.

The logic at 42 responds to the first keystroke during "setup" after pressing the "1" key, so long as this first key is not "0", and displays this key as the first entry from the keyboard as the desired UPC number to be tested. The logic then loops back as indicated at 43, 44 awaiting the next keyboard entry. When all of the desired keyboard entries have been made, the operator enters the "#" key which causes the logic, at 43, 45 to store all digits in RAM, redisplay the main menu and loop back to the logic at 32.

The logic at 60, responsive to the "*" key after the logic at 32 is present, turns off the laser scanner and loops back to the logic at 32. This prevents spurious input from the scanner during a manual input of the desired UPC number and, after the desired UPC number has been entered manually (the logic has now looped back to 32), the "#" key may be pressed to reactivate the scanner to begin a test.

Figure 2B:
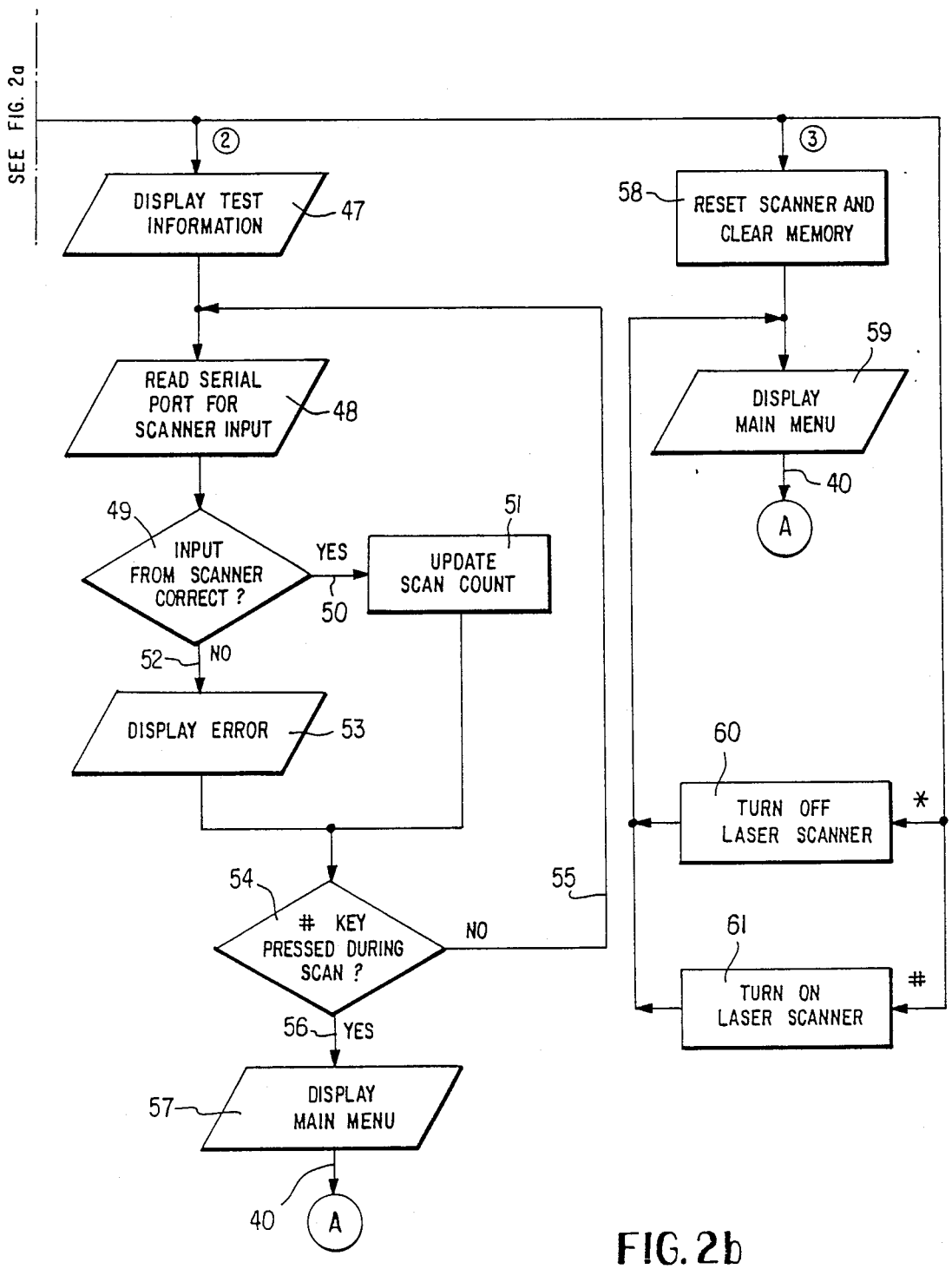
Figure 3A:
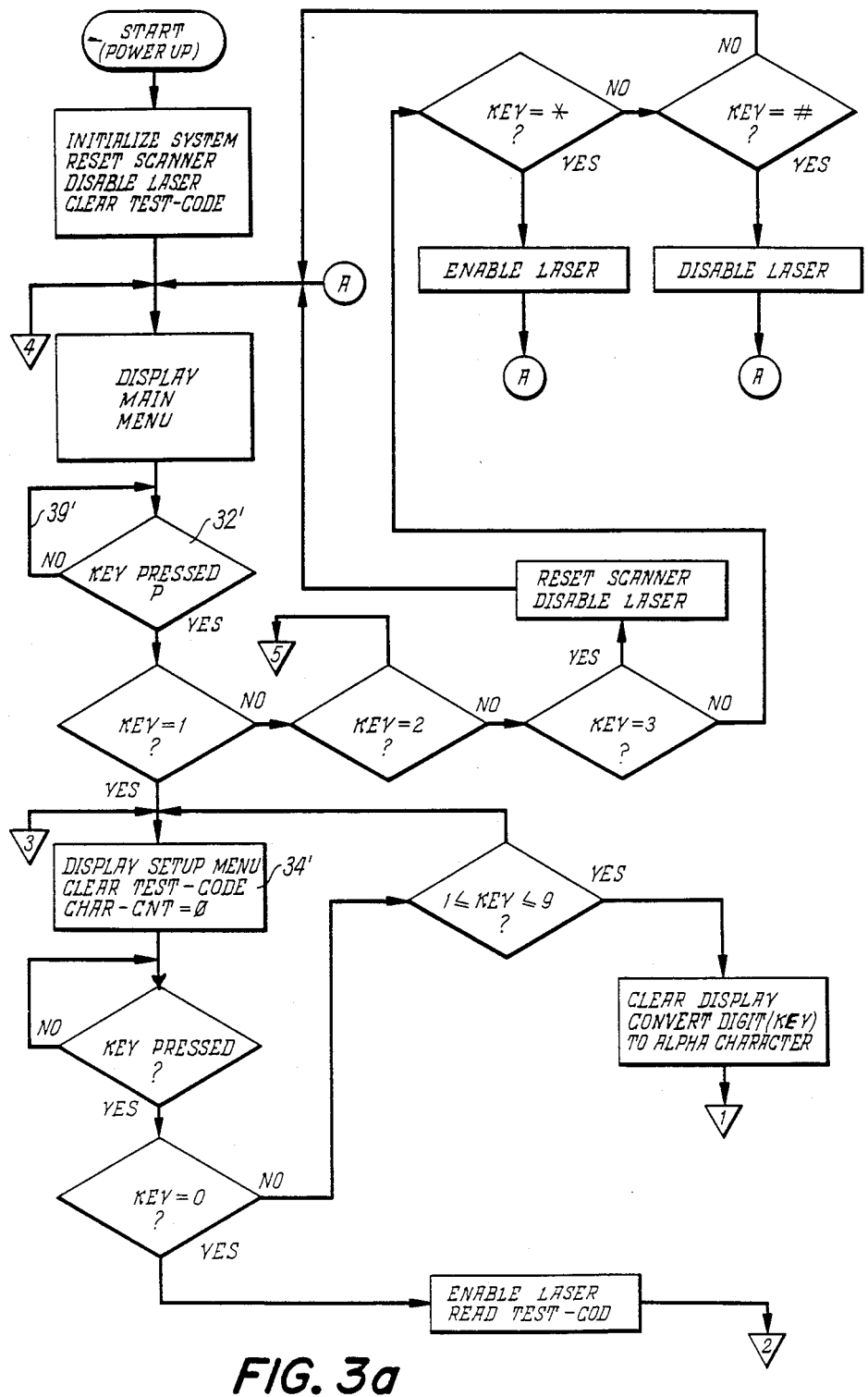
FIGS. 3a and 3b represent another logic flow diagram according to another embodiment of the invention.
Figure 3B:
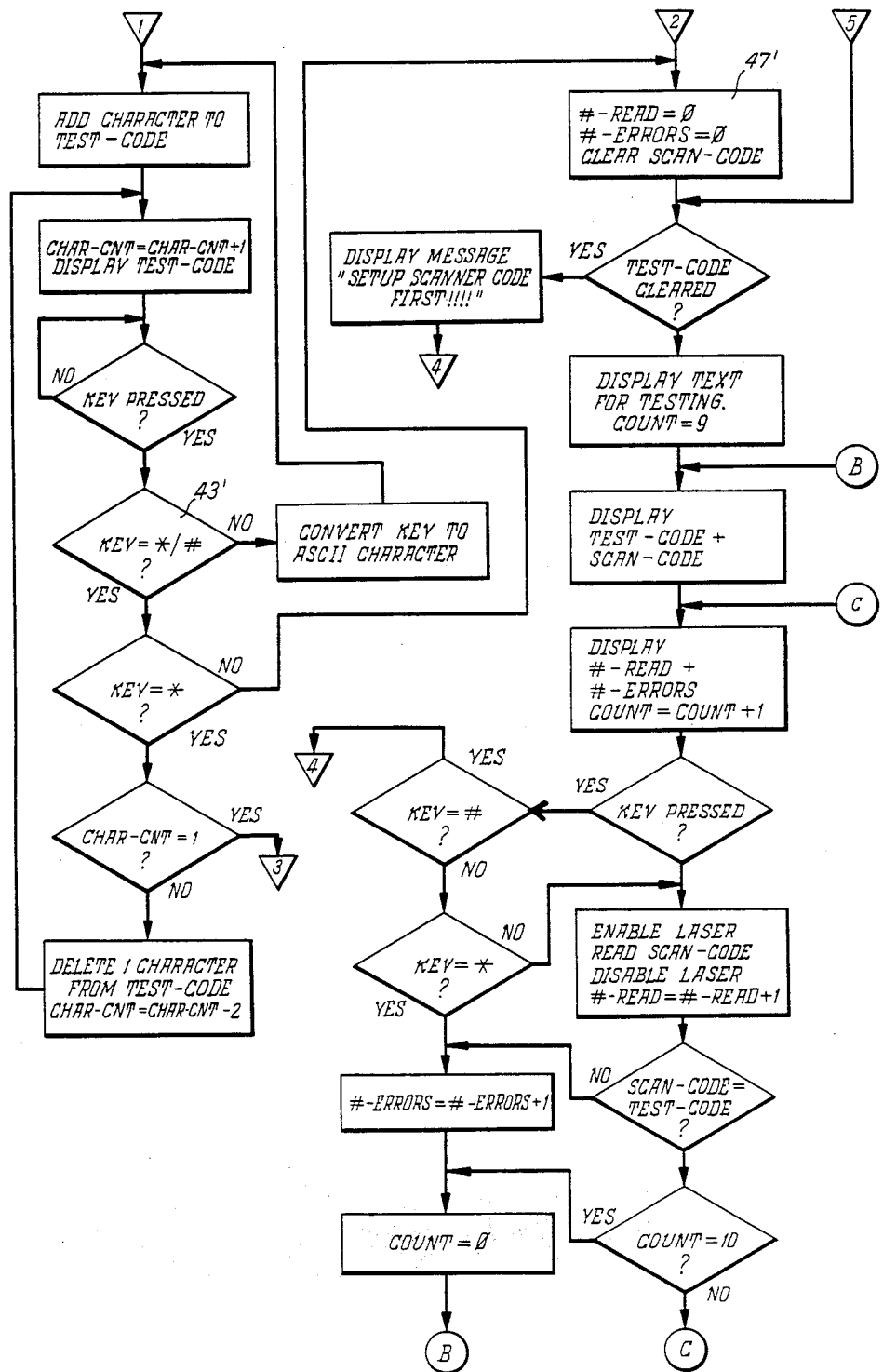

The logic flow illustrated in FIGS. 3a and 3b differs from that described above with relation to FIGS. 2a and 2b principally in that if entry of the correct bar code is made by scanning a correct symbol, the logic rather than returning to the main menu as described above, goes directly to the test mode. Also, the first number scanned during the test mode will be displayed rather than waiting for the tenth scan. Thus, instead of reading "TEST CODE A021900027256 NO. READ 1; CURRENT NO. READ 0" as noted above, the display will be TEST CODE A021900027256 NO. READ 1; CURRENT A021900027256 NO. ERROR 0.

For convenience, primed reference characters are employed in FIGS. 3a and 3b which correspond generally with their unprimed counterparts in FIGS. 2a and 2b.

What is claimed is:

1. Apparatus for providing goods to an end user at a point of sale of the goods with bar codes imprinted thereon which bar codes will correctly indicate the UPC number of the goods at the point of sale thereof based on a statistical sampling of such bar codes, which comprises:

scanning means comprising a helium-neon laser scanner for scanning the imprinted bar codes in substantially the same manner as they will be scanned at the point of sale by the end user;

computer means connected with said scanning means for reading the UPC numbers of a sampling test of the bar codes, said computer means including a program ROM programmed with logic means for causing the computer means to compare the UPC numbers read by the scanning means during a sampling test with the current UPC number to which the bar codes should correspond, and indicating the number of times a correct read is made with respect to the total number of scans during the sampling test; and a keyboard connected to the computer means for controlling the logic means during the sampling test.

2. The apparatus as defined in claim 1, wherein the logic means is controlled by the keyboard to set up said sampling test.

3. The apparatus as defined in claim 2, wherein the logic means is controlled by the keyboard to permit the correct UPC number to be input by the keyboard to the computer means prior to said sampling test.

4. The method of providing an end user with consumer goods labeled with a bar code imprinted thereon, whose dimensions and contrast cannot be controlled by the end user, and which provides a correct UPC number on the consumer goods and from which bar code a scanning device used by the end user will read the correct UPC number from the consumer goods, comprising the steps of:

(a) scanning a sampling of a plurality of bar codes using an apparatus which includes a laser scanner of the type used by an end user of the bar code, a computer means connected with said laser scanner, said computer means including a program ROM programmed with logic means and a keyboard connected to the computer means for controlling the logic means;

(b) indicating the UPC number read as a result of the scan of each of the scanned bar codes;

(c) comparing the result of each scanned bar code with the correct UPC number to which each scanned bar code should correspond;

(d) recording the number of times the comparison of step (c) is in agreement with the correct UPC number;

(e) recording the number of times the comparison of step (c) is not in agreement with the correct UPC number; and (f) determining the acceptability of the batch from which the sampling of step (a) is made from the times the recordation of step (d) is effected with respect to the total of times recorded in both steps (d) and (e), whereby said computer means carries out steps (b) through (e).

5. The method as defined in claim 4, including the step, prior to step (c), of entering a correct UPC number manually.

6. The method as defined in claim 4, including the step, prior to step (c), of entering a correct UPC number by scanning a bar code known to be correct.

7. The method as defined in claim 4, wherein step (a) is effected by a helium-neon laser scanner of in-store quality.

8. The method as defined in claim 4 wherein step (a) consists of scanning a predetermined number of printed bar codes in sequence so that the total number of times recorded in steps (d) and (e) is equal to the predetermined number.

9. The method as defined in claim 4 wherein step (a) consists of scanning a predetermined number of printed bar codes only once each so that the total number of results indicated in step (b) and also the comparisons made in step (c) as well as the number of times recorded in steps (d) and (e) is equal to the predetermined number.

10. The method of providing an end user with consumer goods having a printed bar code associated therewith which correctly identifies the UPC number of the consumer goods and from which bar code a scanning device used at the point of sale by the end user will read the correct UPC number from the consumer goods, comprising the steps of:

(a) recording, by computer means including a program ROM programmed with logic means and having a keyboard connected to said computer means for controlling said logic means, the multiple digit number corresponding to the UPC designation of the particular goods for which a bar code has been printed;

(b) scanning a quality control sampling of printed bar codes on a laser scanner in substantially the same manner as they will be scanned at the point of sale by the end user, each of which bar codes should correspond with the particular UPC number recorded in step (a) and registering the number of times a UPC number read by such scanning is identical to the multiple digit UPC number recorded in step (a) and the number of times a multiple digit number read by such scanning is different from the multiple digit number recorded in step (a); and (c) determining acceptability of the batch of bar codes from which the sampling was made, based upon the percentage of readings in step (b) which are identical to the multiple digit number recorded in step (a) with respect to the total number of readings of step (b).

11. The method as defined in claim 10 wherein step (a) is effected by entering a correct UPC number manually.

12. The method as defined in claim 10 wherein step (a) is effected by entering a correct UPC number by scanning a bar code known to be correct.

13. The method as defined in claim 10 wherein step (b) is effected by a helium-neon laser scanner of in-store quality.

14. The method as defined in claim 13 wherein step (b) is effected by scanning goods having the bar codes printed thereon.

15. The method as defined in claim 4 wherein step (a) is effected by scanning packages having the bar codes printed thereon.

16. The method as defined in claim 10 wherein step (b) consists of scanning a predetermined number of printed bar codes in sequence so that the total number of readings is equal to the predetermined number.

17. The method as defined in claim 10 wherein step (b) consists of scanning a predetermined number of printed bar codes only once each so that the total number of readings of step (b) is equal to the predetermined number.

* * * * *